Aug. 2, 1949.  D. G. REMPEL  2,477,899
METHOD FOR PRODUCING INFLATABLE RUBBER ARTICLES
Filed July 15, 1946  4 Sheets-Sheet 1
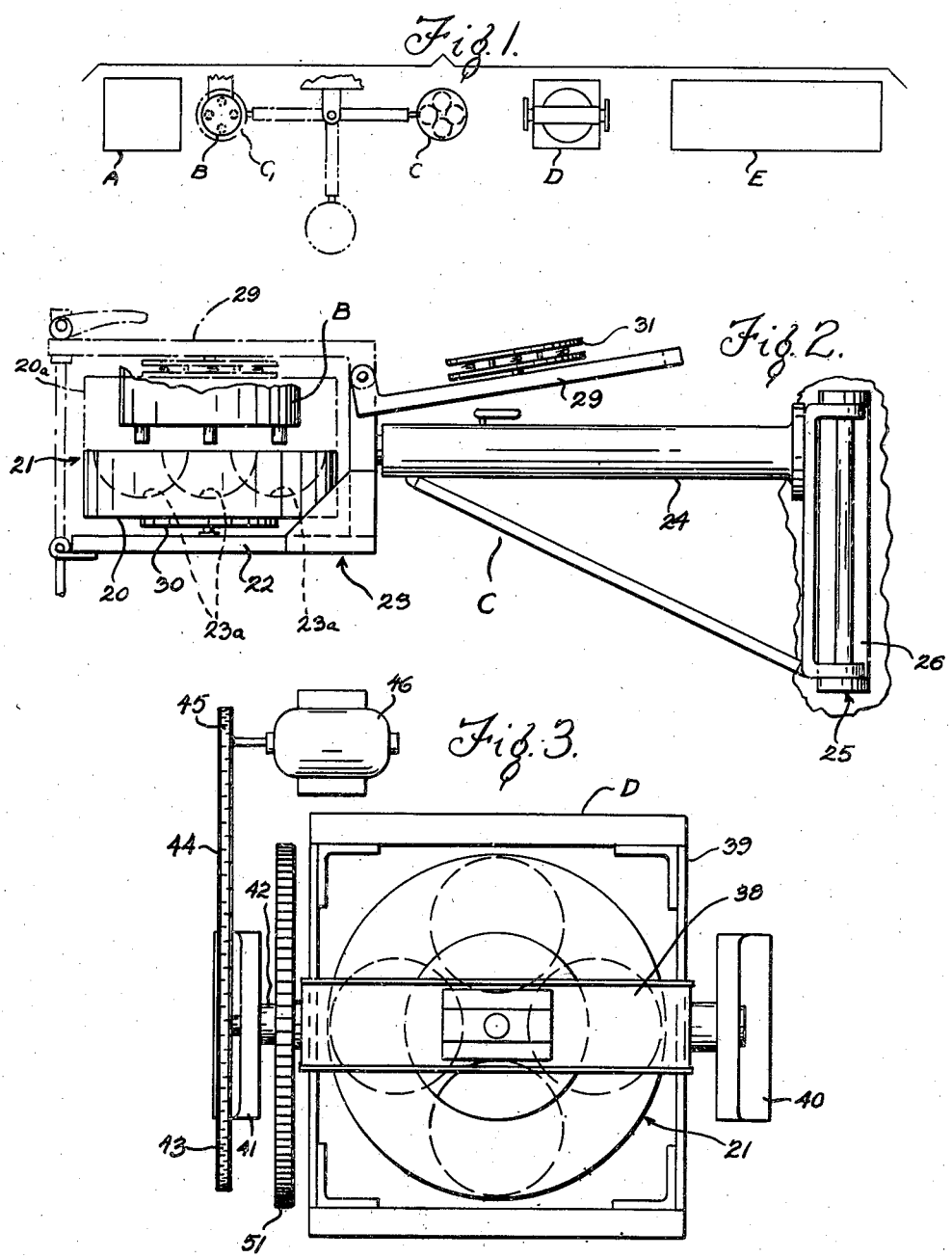
INVENTOR.
Dietrich G. Rempel
BY
William Cleland
Attorney

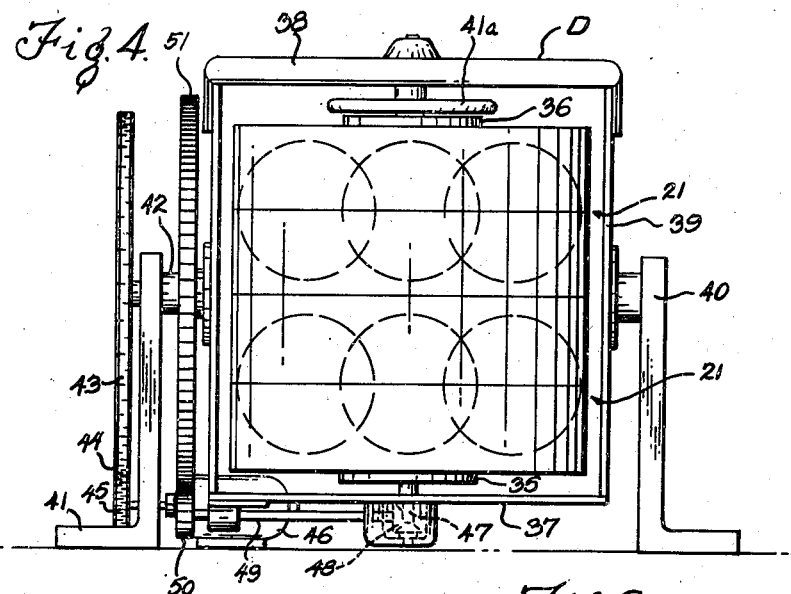
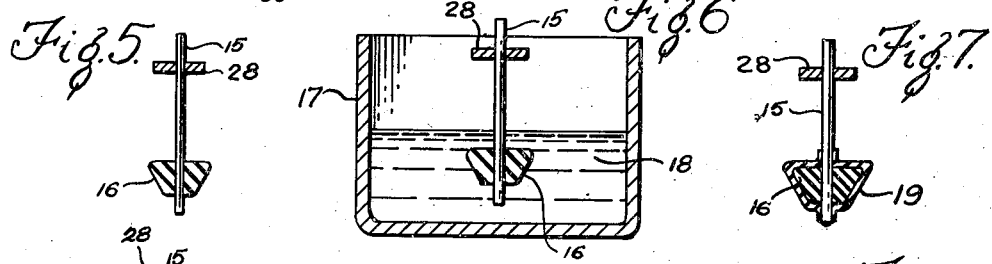
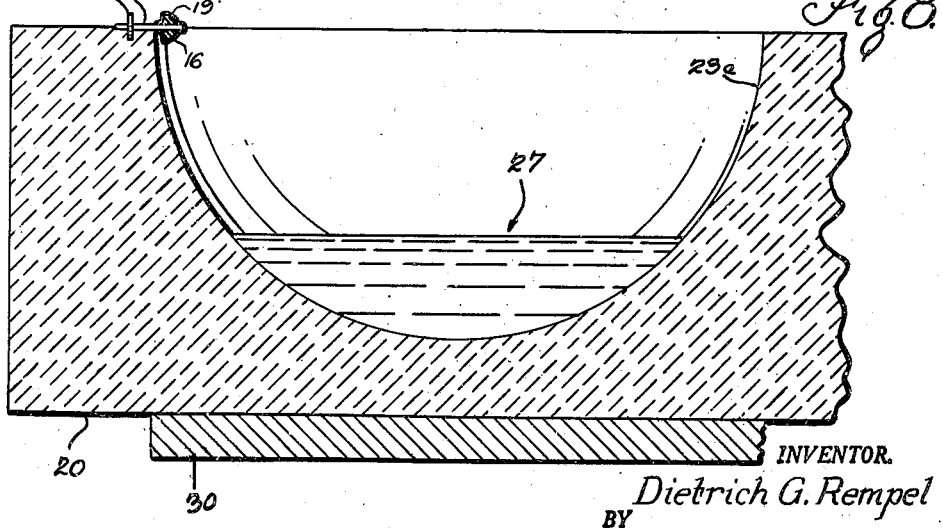

Aug. 2, 1949.   D. G. REMPEL   2,477,899
METHOD FOR PRODUCING INFLATABLE RUBBER ARTICLES
Filed July 15, 1946   4 Sheets-Sheet 3

INVENTOR.
Dietrich G. Rempel
BY
William Cleland
Attorney

Aug. 2, 1949.   D. G. REMPEL   2,477,899
METHOD FOR PRODUCING INFLATABLE RUBBER ARTICLES
Filed July 15, 1946   4 Sheets-Sheet 4
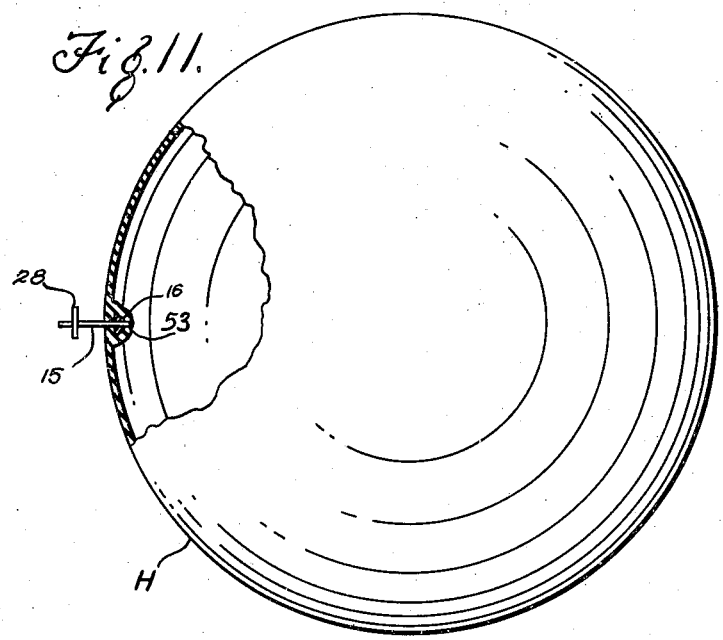
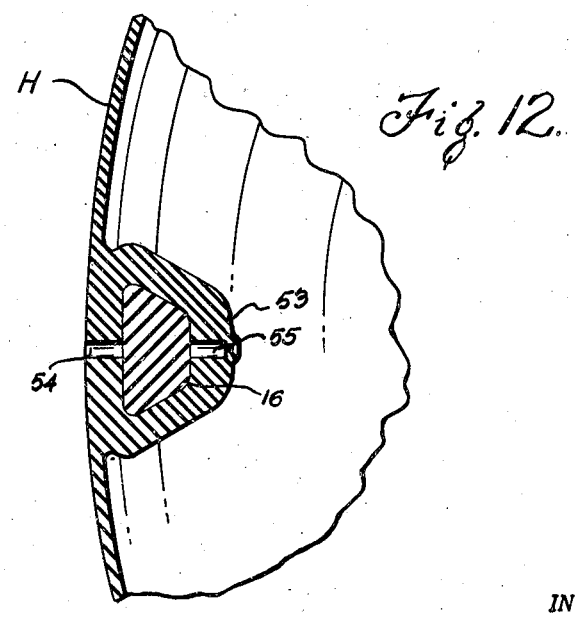
INVENTOR.
Dietrich G. Rempel
BY William Cleland
Attorney Patented Aug. 2, 1949

2,477,899

UNITED STATES PATENT OFFICE 2,477,899

METHOD FOR PRODUCING INFLATABLE RUBBER ARTICLES

Dietrich G. Rempel, Akron, Ohio, assignor, by mesne assignments, to Rempel Manufacturing, Inc., Akron, Ohio, a corporation of Ohio Application July 15, 1946, Serial No. 683,692

6 Claims. (Cl. 18—58.3)

This invention relates to a method and apparatus for producing inflatable rubber articles by deposition of aqueous dispersions of rubber or the like.

In the past various attempts have been made to form hollow rubber articles, for example, by so-called rotary casting methods, but these attempts have not been completely successful and for that reason rotary casting methods have not been generally accepted for large scale production. The accepted practice followed for manufacturing such hollow articles at present utilizes what is known as the "blown" vulcanizing method, wherein preformed hollow biscuits of sheet rubber stock are formed in sectional cavity molds, under the influence of heat and internal pressure. These "blown" methods, however, require extensive factory floor space to accommodate a vast amount of necessary equipment.

One object of the present invention is to provide an improved, practical and commercially acceptable method and apparatus for producing inflatable hollow rubber or like articles of any desired shape or configuration, such as balls, athletic ball bladders, character dolls or animals, etc., by means of which is eliminated not only certain equipment normally required for producing the articles, but also the necessity of providing special molds and other equipment for forming and assembling inflating valve means for the articles.

Another object of the invention is to provide an improved method and apparatus for producing hollow articles by deposition of article-forming material in a hollow mold, and having inserts or other devices integrally formed interiorly of the article.

Another object of the invention is to provide an improved method and apparatus for producing, by deposition of article-forming material in a hollow mold, hollow articles having inserts or other devices integrally formed interiorly of the article, and specifically for producing hollow rubber balls, bladders or other articles with self-sealing valves integrally formed in the walls thereof.

These and other objects of the invention will be manifest from the following brief description and the accompanying drawings.

This application is a continuation in part of copending application Serial No. 683,335, filed July 13, 1946.

Of the accompanying drawings:

Figure 1 is a composite plan view illustrating a suitable arrangement of equipment for carrying out the method of the invention.

Figure 2 is a side elevation of a machine for applying a preliminary compound rotary motion to an article-forming mold, in accordance with the method of the invention.

Figure 3 is a top plan view of a machine for applying a subsequent or secondary compound rotary motion to the mold or molds.

Figure 4 is a front elevation of the machine shown in Figure 3.

Figure 5 illustrates a pin or core received through a preformed insert of self-sealing material, for providing an inflating valve in a hollow rubber ball or like article.

Figure 6 is a view illustrating a step of dipping the stem and insert of Figure 5 in latex.

Figure 7 is a view similar to Figure 5 after the latex dipping operation.

Figure 8 is a fragmentary cross-section of a lower mold section, illustrating a subsequent step in the method wherein a predetermined volume of latex is placed in the mold cavity.

Figure 11 is an elevational view of a completed hollow rubber ball, partly broken away and in section, after removal thereof from the mold of Figure 10, and before removal therefrom of the valve insert supporting stem of Figure 5.

Figure 12 is an enlarged fragmentary view of the valve portion of the ball of Figure 11, after removal of the valve insert supporting stem.

Figure 9:
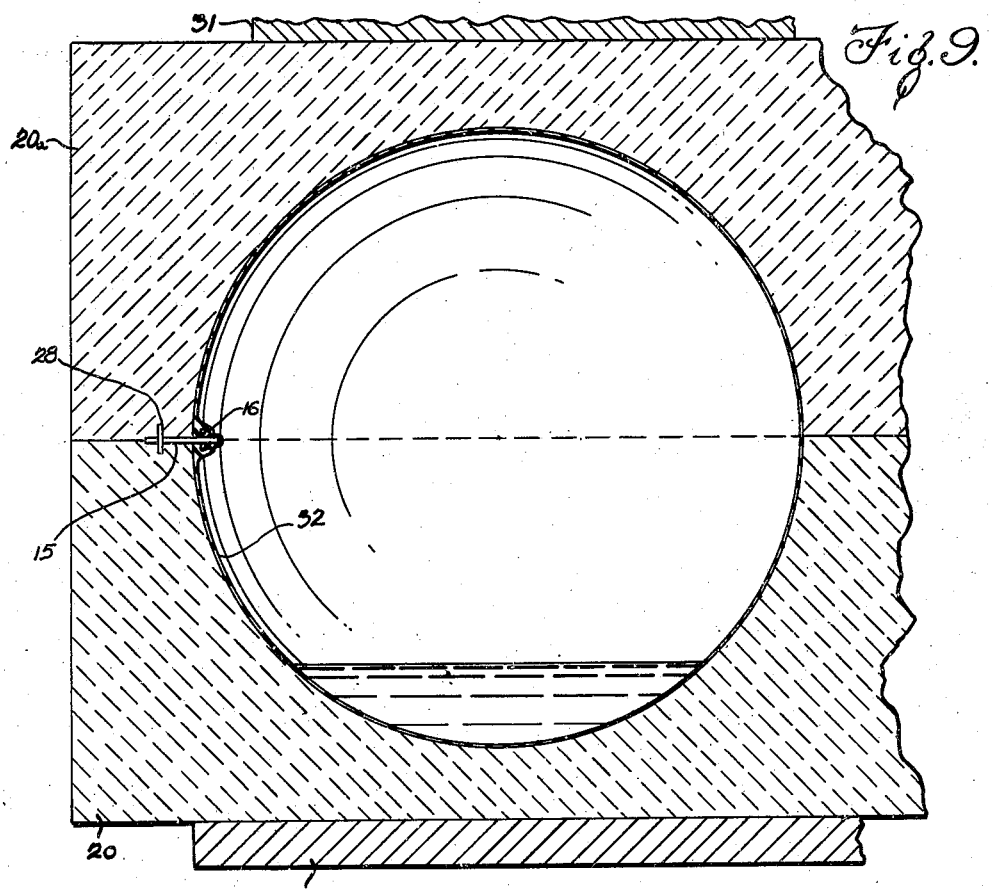
Figure 9 is a similar fragmentary cross-section through the closed mold, after a preliminary compound rotation thereof in the apparatus of Figure 2.

The improved method may be best described in connection with the operation and use of equipment illustrated in certain figures of the drawings. Referring particularly to Figure 1 thereof, there is illustrated semi-diagrammatically, apparatus for carrying out the method of the invention, the same including a latex dipping tank A, a latex measuring and supplying device B, a primary mold rotating machine C, a secondary mold rotating machine D, and a drying chamber E.

In carrying out the method, as for example to produce an inflatable hollow rubber ball H of the type best illustrated in Figures 11 and 12, a pin or stem 15 may have placed thereon a pre-shaped insert 16, of unvulcanizable, rubber or other material of the type which is self-sealing upon being punctured as by a pointed implement, the insert being located at a predetermined distance from one end of the stem, and then the stem may be dipped to predetermined depth in a tank 17 of latex 18 as shown in Figure 8. The term latex includes aqueous dispersion of rubber or synthetic elastomers. This operation may be repeated as necessary to form a deposit 19 of desired thickness of latex about the insert 16 (see Figure 7).

Next, the lower half or section 20 of a two-part cavity mold 21, composed of porous material, is mounted on a horizontally positioned plate 22, of a mold support 23 of the mold rotating machine C, the plate 22 being journalled in a sleeve 24 to rotate on a horizontal axis, and the sleeve 24 being pivotally mounted at 25 to supporting bracket 26 to be swingable to move the mold support 23 toward and from the latex measuring and supplying device B. In the chain-dotted position of the mold-supporting plate 23, indicated at $C_1$ in Figure 1, a predetermined volume of rubber latex, or like aqueous dispersion of rubber or synthetic elastomer, is supplied to each of a plurality of article-forming cavities 23a, 23a in the lower mold half 20, as indicated at 27 in Figure 8. Prior to this operation or simultaneously therewith the latex-dipped pins 15 and inserts thereon of Figure 7 may be placed in suitable recesses provided in the parting face of the lower mold section with the inserts 16 projecting inwardly of the mold cavities to a predetermined extent. Washers or collars 28 are provided on the pins for engagement in correspondingly recessed portions in the upper and lower mold sections for so locating the inserts 16.

Immediately upon supplying said predetermined volumes of latex 27 to the lower mold cavities the mold-holding apparatus C is swung away from the filling device B, to a position in which the upper mold section 20a may be readily placed in registry on the lower mold section 20, and then a releasable clamping device 29 is operated with respect to the support 23 to retain the mold sections thereon in tightly closed relation. In this last-named closed position of the mold it is engaged between a disc 30 rotatably mounted on the plate 22 and a coaxial disc 31 yieldingly and rotatably mounted on the shiftable clamping device 29, the common axis of the discs being at right angles to the axis upon which the support 23 rotates in sleeve 24. Immediately after filling the lower mold cavities with the latex 27 the closed mold 21 may be manually rotated relatively of the support 23 about said axis of the discs, simultaneously with manual rotation of said support 23 about the axis of the sleeve 24, thereby applying a compound rotary movement to the mold about the two axes. Although this preliminary compound rotary movement preferably is applied as quickly as possible after the latex pouring step the rotary motion is slow enough that bubbles will not form on the surface of the mold cavity. The movement described is effective to spread a thin deposit or skin-coating of the article-forming material 27 about the surfaces of the mold cavities at the earliest possible time after the latex is poured into the same. The quick preliminary coating step prevents the creation of defects in the nature of fissures in the outer surfaces of the deposited articles, caused by surface tension and/or premature gellation or drying of the fluid material around the peripheries of the mold cavities at the surfaces of the fluid bodies of latex therein (see Figure 8). The formation of such defects in the manner described is extremely objectionable, as in most instances they render the articles commercially unacceptable.

Although the improved latex deposition method, particularly as applied to the use of the foregoing preliminary mold rotating step, is adapted to be carried out in molds of substantially any kind of material, the method may be most satisfactorily carried out with the use of porous molds. For this purpose, the molds may be made very economically of plaster of Paris, clay, or like material which in molded form is sufficiently porous to aid deposition of the latex by capillary attraction, and yet which is of such nature that the article-forming cavity surfaces will have requisite smoothness for making correspondingly smooth surfaced articles.

When once the preliminary skin-coatings 32 have been deposited about the interior of the mold cavities as best illustrated in Figure 9, the secondary rotary article-forming step may be accomplished in a more liesurely manner in the mold rotating machine D (see Figures 1, 2, 3 and 4).

Figure 10:
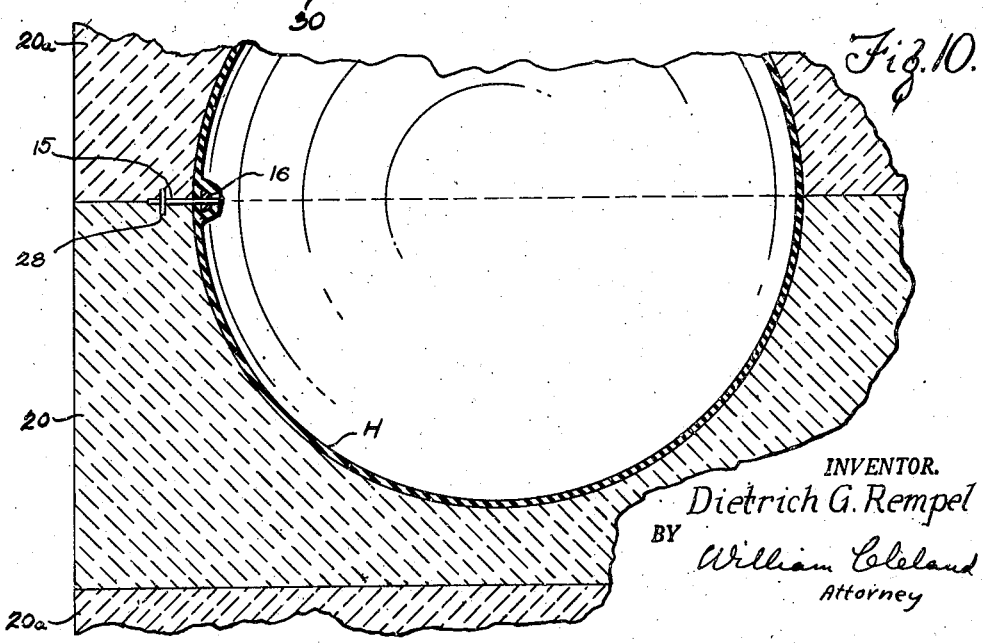
Figure 10 is a view similar to Figure 9, partly broken away, illustrating the completely formed article in the closed mold, after it has been subjected to a secondary compound rotary motion, in the machine of Figures 3 and 4.

Accordingly, while the preliminary mold rotating action is taking place the mold rotating device C may be shifted to the full-line position thereof shown in Figure 3, to be relatively closely adjacent the secondary mold rotating machine D. At this point the mold 21 is removed from the mold-holding device 23, and while the sections of the mold are retained in close registering position it is placed in the rotating machine D for a secondary relatively slow compound rotary casting operation. One or more molds 21 may be moved from the device C to the machine D in succession, as by means of a hoist or other means, until the machine D is filled to capacity with molds. In the present instance the machine D is illustrated as containing two such molds, the same being stacked between spaced plates 35 and 36, coaxially rotatably mounted on spaced cross-pieces 37 and 38 of a rectangular frame 39, which is in turn supported on spaced brackets 40 and 41 to rotate about a horizontal axis at right angles to the axis of rotation of the plates 35 and 36. The cross-piece 38 may be releasably shiftable outwardly of the frame, by suitable means as shown or otherwise, to permit such stacking or removal of molds from the frame. A suitable device 41a is provided in association with plate 36 to apply clamping action thereto for holding the molds tightly together. For rotating the mold supporting frame 39 about its horizontal axis, a relatively fixed shaft extension 42 therefrom has a gear 43 keyed thereto to be driven, through a chain 44 and sprocket 45, by suitable motor 46. To the end that the molds 21, together with the discs 35 and 36 may be rotated about an axis angularly of said horizontal axis, a shaft extension 47 from disc 35 has a bevel gear connection 48 with a shaft 49 carried by the frame 39, and a spur gear 50 on a free end of the shaft 49 engages a fixed relatively larger gear 51 secured to the fixed support 41. This arrangement is such that as the motor 46 drives gear 43 to rotate the frame 39 about the horizontal axis, and this rotational movement of the frame carries spur gear 50 around fixed gear 51, said gear 50 is thereby driven to rotate shaft 49, and through bevel gears 48 applying rotary motion to the molds about an axis at right angles to the axis of rotation of the frame 39. The compound rotary motion thus attained in machine D is relatively slow, as for example approximately one revolution per minute about each of the two axes, preferably with a slight differential in the speeds about the respective axes to assure complete uniform latex coverage of all cavity surface areas. Highly satisfactory results have been attained by rotating the molds one revolution per minute about one axis and one and one quarter revolutions per minute about the other axis, or otherwise in accordance with particular conditions or requirements. The compound rotary action provided by the machine D is effective to deposit the remainder of the article-forming latex body 27 about the interior of the mold cavities over the previously deposited skin-coating 32, as well as to apply a requisite thickness of additional latex over the self-sealing insert 16 (see Figure 10).

It has been found also that in forming hollow rubber articles in particular, the setting or gelling action of the latex on the mold cavity surface is relatively rapid during the initial compound rotational movements of the mold, and that as the rotational movement is continued the rate of speed of the setting or gelling action becomes slower and slower until it levels off to a constant relatively slow gelling action. This no doubt accounts for the improved success of the present method attained by providing a preliminary quick compound rotational movement of the molds to deposit a skin-coating, as described. That is, the tendency for the latex to adhere to the mold cavity at the surface of the latex body in the mold would be at a maximum immediately after the latex is poured into the mold.

After the secondary compound rotary action has been carried out in machine D for a substantial period of time, which may vary according to the thickness required in the completed ball, the machine is stopped and the molds therein may be allowed to continue what may be termed a self-curing period, the characteristic of which is inherent in most rubber or rubber-like materials. During this period the rubber will acquire full elastic strength, and this particular phase of the process may be accomplished while the articles are in the molds or after they are removed therefrom, but the curing time may be considerably reduced by placing the molds in a heated oven or drying chamber E (Figure 11). For example, rubber articles may be completely cured in chamber E, maintained at a temperature of approximately 200° F., in about four hours.

Because the formed wall of the rubber article adheres tenaciously to the cavity surfaces of the porous molds, during the roto-forming procedure, no internal pressure is required to hold the articles in shape against shrinkage upon setting or gelling. When heat is applied in chamber E as described to shorten the curing period the consequent internal pressure, due to heated air in the articles, holds the same to full size and shape. Upon the fully cured articles being removed from the porous molds, any shrinkage which then occurs is relatively slight and is substantially uniform, regardless of the shapes of the particular articles being produced.

In any case, when the molds 21 have been opened and the fully formed balls removed therefrom (see Figure 11) the stems 15 are removed therefrom. A ball produced in this manner will have a wall of substantially uniform thickness, with an integral rubber valve member projecting inwardly thereof and substantially integrally formed about the self-sealing insert 16, by reason of the inherent bonding affinity of the deposited or accreted latex for the latex coating 19 on the insert. Aligned apertures 54 and 55 formed in member 53 by the stem 15 facilitates insertion of the inflation needle of a suitable air pump or an air supply nozzle (not shown) for subsequent inflation of the ball. The rubber, if any, which may form at the end of the stem 15 will be readily punctured by such insertion of the inflation needle through the valve device 53. This procedure for providing a self-sealing valve, concurrently with the ball-forming operations, is very economical as compared with other well-known methods, which usually require the valve part to be molded separately.

It will be readily seen that the above-described method for providing an inflating valve may be utilized for providing other types of hollow articles with inserts, such as an attaching insert or plate (not shown). Similarly, in the case of a ball or other article, an integral whistle or noise-making device may be provided, by substituting for the self-sealing material on pin 15, an insert of pre-shaped wax or other heat-fusible material. As no heat is necessarily utilized in the rubber deposition steps of the article-forming procedure, the wax core is not affected during the article-forming steps; and is easily removed from the completed article by application of heat to fuse the core, thereby to provide an inward projection as shown in Figure 12, but with a hollow sound-making chamber in spaces occupied by the insert. The aligned apertures formed by the pin 15 in such case permits passage of air through said sound chamber in known manner of such devices.

Although the improved process has been described particularly in connection with the production of hollow rubber balls, it has been successfully employed in producing hollow articles of irregular shapes, such as character animals (not shown).

Similarly, the improved process may be successfully employed in the production of articles from materials other than rubber, with inserts of various shapes and sizes embedded in the walls thereof, where the article-forming material is adapted to be supplied in an aqueous solution capable of self-setting or gelling in a porous mold.

The herein described method in accomplishing the stated objects of the invention makes possible the production of hollow articles which could not be produced heretofore by other known methods. The resulting products are not only of superior quality, but can be produced at greatly reduced cost, as compared with said known prior methods.

Modifications of the invention may be resorted to, without departing from the spirit thereof or the scope of the appended claims.

What is claimed is:

1. A method of producing hollow articles comprising the steps of providing a sectional cavity mold of porous material and a predeterminately shaped insert positioned in the mold cavity in spaced relation to the surface thereof and coated with material on which latex aqueous dispersion material is capable of being deposited because of an inherent affinity for the coating material, applying rotative movement to said mold about a plurality of angularly disposed axes while containing latex aqueous dispersion material and thereby to deposit a predetermined thickness of the same in successive accreted layerings over the article-forming surface portions of the mold cavity by capillary movement of water outwardly through the mold pores and evaporation at the outer mold surface portions, said rotative movement simultaneously depositing a thickness of the dispersion material over said coated insert.

2. A method of producing hollow articles comprising the steps of providing a sectional cavity mold of porous material and a predeterminately shaped insert positioned within the mold cavity in spaced relation to the surface thereof and coated with rubber on which latex aqueous dispersion material is capable of being deposited because of an inherent affinity thereof for the rubber coating, applying rotative movement to said mold about a plurality of angularly disposed axes while containing a predetermined quantity of latex aqueous dispersion material and thereby to deposit the same in successive accreted layerings over the article-forming surface portions of the mold cavity by capillary movement of water outwardly through the mold pores and evaporation at the outer mold surface portions, and said rotative movement simultaneously depositing a thickness of the dispersion material over said coated insert.

3. A method of producing hollow articles having an inflation device, comprising the steps of dipping a pre-shaped self-sealing puncturable insert one or more times in a liquid having bonding affinity for said element and for latex to form a coating of the bonding liquid over the insert, positioning said insert in a sectional cavity mold of porous material to be inwardly spaced from the mold cavity surface, placing in said mold a predetermined quantity of latex aqueous dispersion material and thereafter applying compound rotary motion to said mold about a plurality of angularly disposed axes to deposit the dispersion material over the surface portions of the mold cavity in successive accreted layerings by capillary removal of water outwardly through the mold pores and evaporation at the outer mold surfaces, said rotary motion also being effective to deposit a thickness of dispersion material over said coated insert, removing the resulting article from said mold with said insert incorporated in the article.

4. A method of producing hollow articles having an inflation device, comprising the steps of dipping a pre-shaped self-sealing puncturable insert one or more times in latex to form a coating thereof over the insert, positioning said insert in a sectional cavity mold of porous material to be inwardly spaced from the mold cavity surface, placing in said mold a predetermined quantity of latex aqueous dispersion material and thereafter applying compound rotary motion to said mold about a plurality of angularly disposed axes to deposit the latex over the surface portions of the mold cavity in successive accreted layerings by capillary removal of water outwardly through the mold pores and evaporation at the outer mold surfaces and simultaneously depositing an additional thickness of dispersion material over said coated insert and removing the resulting article from said mold with said insert incorporated in the article.

5. A method of producing hollow articles comprising the steps of dipping a predeterminately shaped insert one or more times in a body of latex aqueous dispersion material, to form a coating thereof on the insert, attaching said dipped insert in a sectional cavity mold of porous material to project inwardly of the cavity surface thereof, supplying a quantity of latex aqueous dispersion material to said mold cavity, applying rotative movement to said mold about a plurality of angularly disposed axes to deposit a thickness of said dispersion material in successive accreted layerings over the surface of the mold cavity by capillary attraction of water from the dispersion material outwardly through the mold pores and evaporation at the outer mold surface portions, a thickness of the dispersion material integral with the first-named thickness thereof being deposited over said projecting insert by the inherent affinity of the deposited latex with respect to said coating on the insert.

6. A method of producing a hollow article having an inflation device incorporated therein, comprising the steps of removably placing on a stem an insert of self-sealing puncturable material in the nature of non-vulcanizable rubber, dipping said insert at least once in a liquid having a bonding affinity for said insert material and for latex aqueous dispersion material, removably positioning said stem in a sectional cavity mold of porous material to have said insert presented inwardly of the mold cavity surface, applying compound rotary motion to said mold about angularly disposed axes while the mold contains a predetermined quantity of latex aqueous dispersion material, thereby to deposit the dispersion material in successive accreted layerings over said mold cavity surface portions by capillary removal of water from the dispersion material outwardly through the mold pores and evaporation at the outer mold surface portions, and simultaneously depositing a thickness of the dispersion material over the surface of said insert, removing the formed article from the mold, and removing said stem from said self-sealing insert in the article.

DIETRICH G. REMPEL.

REFERENCES CITED

The following references are of record in the file of this patent:

UNITED STATES PATENTS

| Number | Name | Date |
|---|---|---|
| Re. 15,641 | Emery | July 3, 1923 |
| 803,799 | Voelke | Nov. 7, 1905 |
| 1,263,141 | Strauss | Apr. 16, 1918 |
| 1,538,789 | Flemming | May 19, 1925 |
| 1,573,577 | Roberts | Feb. 16, 1926 |
| 1,998,897 | Kay | Apr. 23, 1935 |
| 2,230,151 | Winder | Jan. 28, 1941 |
| 2,338,827 | Teague et al. | Jan. 11, 1944 |